United States Patent
Madni et al.

(10) Patent No.: US 6,564,654 B2
(45) Date of Patent: May 20, 2003

(54) VERTICAL MOVEMENT CAPACITIVE TORQUE SENSOR

(75) Inventors: Asad M. Madni, Los Angeles, CA (US); Jim B. Vuong, Northridge, CA (US); Mitchell London, Buena Vista, CA (US)

(73) Assignee: BEI Sensors & Systems Company, Inc., Sylmar, CA (US)

( * ) Notice: Subject to any disclaimer, the term of this patent is extended or adjusted under 35 U.S.C. 154(b) by 0 days.

(21) Appl. No.: 09/970,339

(22) Filed: Oct. 2, 2001

(65) Prior Publication Data

US 2003/0010138 A1 Jan. 16, 2003

Related U.S. Application Data

(63) Continuation-in-part of application No. 09/904,067, filed on Jul. 11, 2001.

(51) Int. Cl.$^7$ ................................................. G01L 3/14
(52) U.S. Cl. ............................. 73/862.337; 73/862.325
(58) Field of Search ........................ 73/862.337, 862, 73/862.325, 862.326, 862.339

(56) References Cited

U.S. PATENT DOCUMENTS

| | | | | |
|---|---|---|---|---|
| 3,517,282 A | * | 6/1970 | Miller | ........................ 361/279 |
| 3,729,991 A | * | 5/1973 | Hardway, Jr. | ................ 324/660 |
| 4,244,219 A | | 1/1981 | Takahashi | |
| 4,680,976 A | | 7/1987 | Lustenberger et al. | |
| 5,099,386 A | * | 3/1992 | Stokes et al. | ................ 324/725 |
| 5,537,109 A | * | 7/1996 | Dowd | ......................... 324/658 |
| 6,211,641 B1 | * | 4/2001 | Johnson et al. | ............. 318/660 |
| 6,218,803 B1 | * | 4/2001 | Montagu et al. | ............. 318/652 |

FOREIGN PATENT DOCUMENTS

JP          03154835 A    *  7/1991  .............. G01L/3/10

OTHER PUBLICATIONS

Christopher O. Nwagboso, "Automotive Sensory Systems," Chapman & Hall, 1992 (pp. 3.1–3.10).

* cited by examiner

Primary Examiner—Hezron Williams
Assistant Examiner—Lilybett Martir
(74) Attorney, Agent, or Firm—Coudert Brothers LLP

(57) ABSTRACT

A vertical movement capacitive torque sensor for a rotating shaft such as the steering column of an automobile includes dielectric vanes interposed between capacitor plates which are moveable proportional to the angular displacement of two shaft portions which are linked by a torsion bar or concentric inner and outer shaft portions, the vanes move in a radial direction perpendicular to the shaft axis. Concentric capacitor rings are provided so that a bridge circuit can easily indicate differential capacitance which is proportional to clockwise or counter-clockwise torque.

8 Claims, 5 Drawing Sheets

VERTICAL MOVEMENT CAPACITIVE TORQUE SENSOR

A CROSS REFERENCE TO RELATED APPLICATIONS

The present application is a continuation in part of application Ser. No. 09/904,067 filed Jul. 11, 2001 entitled "Differential Capacitive Torque Sensor.

INTRODUCTION

The present invention is directed to a vertical movement capacitive torque sensor for a rotating shaft and more specifically to sensor for automotive applications including steering.

BACKGROUND OF THE INVENTION

As disclosed in the above copending application, recent requirements from the automotive industry for reduced engine power consumption have dictated the replacement of the power steering hydraulic pump with a much more efficient electric motor geared to the steering shaft to assist the steering effort. The main problem has been sensing the effort being applied by the driver so as to know how much to assist in the steering effort.

The above copending application (of which this is a continuation) discloses a differential capacitive torque sensor where an apertured metal cage shields a dietetic rotor. The relative rotation the apertured cage changes the shielding to thus change the overall differential capacitance of the system to proportionately indicate torque.

OBJECT AND SUMMARY OF INVENTION

It is therefore an object of the present invention to provide an improved vertical movement capacitive torque sensor.

In accordance with the above object, there is provided a vertical movement capacitive torque sensor for a rotating shaft having an axis of rotation and having two portions for which applied torque to one portion causes an angular displacement with respect to the other portion the sensor comprising means for capacitively sensing the angular displacement between shaft portions including, at least one dielectric vane mounted for movement perpendicular to said axis and rotatable with one shaft portion, the vane having a cam surface on which a pin mounted for rotation with the other shaft portion rides and opposes means biasing the vane in a radially outward directions. A pair of concentric capacitor plate rings lying in a common plane encircle one shaft portion and are juxtaposed with the vane. An opposed capacitor plate encircles the other shaft portion and is also juxtaposed with the vane. Electrical bridge means for compare the capacitances formed between the pair of concentric rings and the opposed capacitor plate as modified by the movable vane for determining the angular displacement and applied shaft torque.

DETAILED DESCRIPTION OF PREFERRED EMBODIMENTS

Capacitive sensing technology is well known. The value of a capacitor depends on the permitivity of the dielectric material between the capacitor plates, the area of the plates and the distance between the two plates. Any one of these parameters may be used in the sensing process.

A displacement sensor can be constructed by sliding a piece of dielectric material in an out of the parallel plates of a capacitor. This is not suitable for real life applications due to environmental effects such as humidity. The dielectric constant of air is very close to one in dry conditions. However, when the humidity increases, the media will no longer be pure air but a mixture of air and water molecules which will have a dielectric constant greater than one resulting in significant displacement errors. In order to overcome this problem, it is known to utilize a ratiometric capacitive sensor. Here side-by-side parallel plate capacitors are arranged and the length of the movable dielectric material is larger than the length of any individual capacitor. The character of this construction can be defined by the ratiometric formula of the ratio of the two capacitances. In this construction, the movement of the dielectric between the plates is desired to be sensed. Such can be done by the capacitive sensor signal conditioning circuit illustrated in FIG. 3 which is commercially available. Here the voltage output $V_T$ is the ratio of the difference and the sum of the individual capacitances times a constant. Since the sensor is based on a ratiometric arrangement environmental effects such as humidity, temperature, etc. will have a minimal effect on the accuracy due to the fact that the value of C1 and C2 will track (increase and decrease proportionally) each other. The foregoing is only suitable for a linear displacement type of sensor. However, using the foregoing technique, rotary capacitive sensors are possible but are limited to a maximum angle of 180°. Such a construction would have one common circular capacitive plate with a split capacitive plate in half circles sandwiching a rotary dielectric. Where it is desired to sense the torque of, for example, rotating machinery or steering wheel of an automobile which was several turns from lock to lock, such a construction is not usable.

Figure 1A:
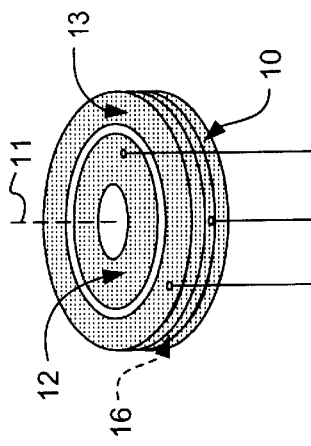
FIGS. 1A and 1B are plan views of two capacitor portions of the present invention.
Figure 1B:
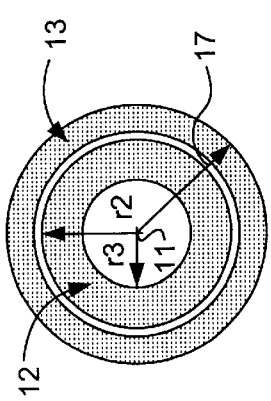
Figure 2:
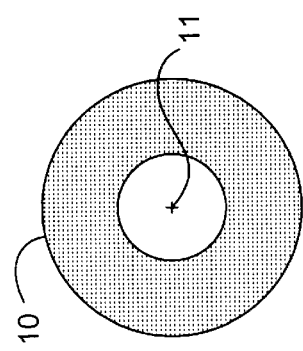
FIG. 2 is a perspective view of the combination of FIGS. 1A and 1B as they would be actually used on a shaft whose torsion is to be determined.

FIGS. 1A, 1B and 2 illustrate the plates of the capacitor of the present invention without the inserted dielectric. FIG. 1A shows an annular or ring-type capacitor plate 10 encircling a shaft 11 (only the axis being shown of the shaft). This is opposed to a pair of concentric capacitor plate rings 12 and 13 lying in the same plane with each other and encircling again the shaft axis 11. As discussed above, as illustrated in FIG. 2, they would be mounted on the shaft 11 in close proximity but with a dielectric 16 therebetween. Such dielectric will be discussed in detail later. As illustrated in FIG. 2, the capacitance C1 occurs between plate 10 and the outer concentric ring 13 and the capacitance C2 occurs between the plate 10 and the inner ring 12. Ring plates 12 and 13 should desirably have equal areas in order to provide a balanced capacitive output (that is equal capacitances C1 and C2) at zero torque. Equal areas can easily be provided by simple geometry. Referring to FIG. 1B where the three pertinent radii are shown for equal area capacitive plates and the following formula is applicable:

$$r_2 = \sqrt{\frac{r_1^2 + r_3^2}{2}}$$

Figure 4:
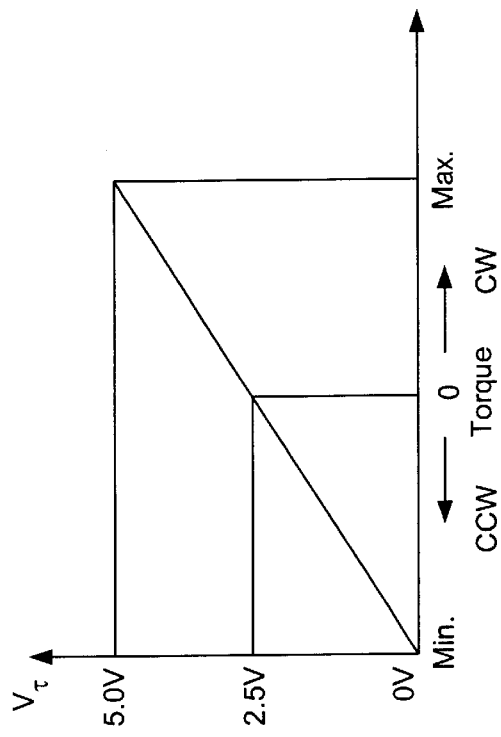
FIG. 4 is a diagram illustrating the operation of FIG. 3.
Figure 3:
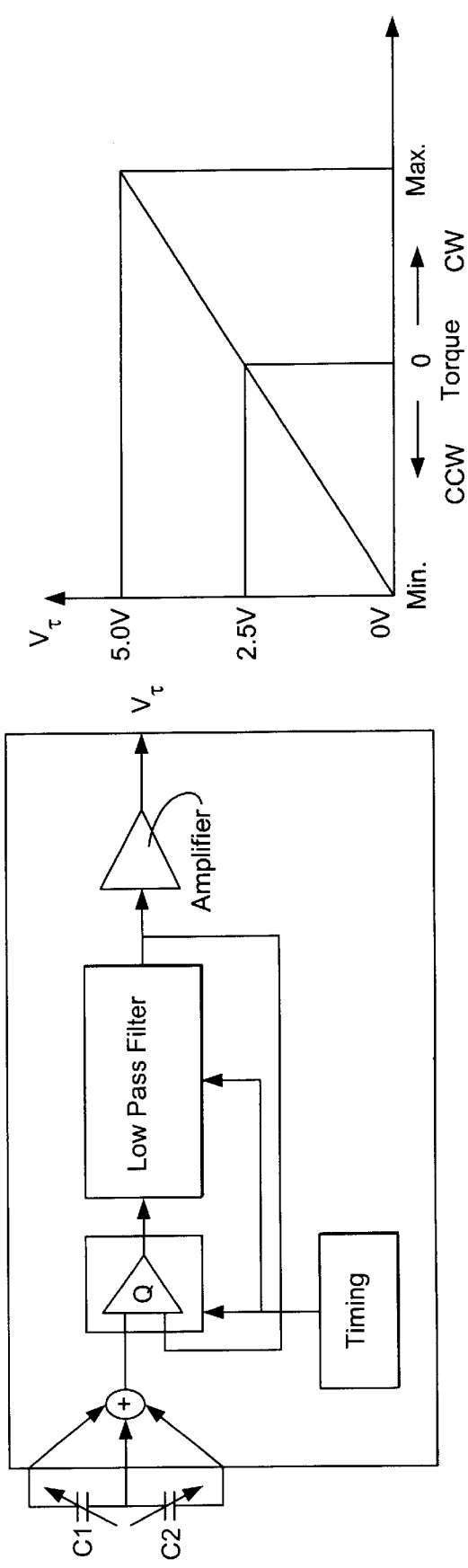
FIG. 3 is a schematic diagram showing how the capacitances of FIG. 2 are processed.

Referring now to FIGS. 3 and 4, when the capacitances C1 and C2 are compared, they produce the output voltage $V_T$ and as illustrated in FIG. 4 when there is a balanced condition at, for example, 2.5 volts, this indicates zero torque. A maximum clockwise torque may be slightly less than 5.0 volts and a maximum counter-clockwise torque may be slightly above 0.0 volts.

Figure 5:
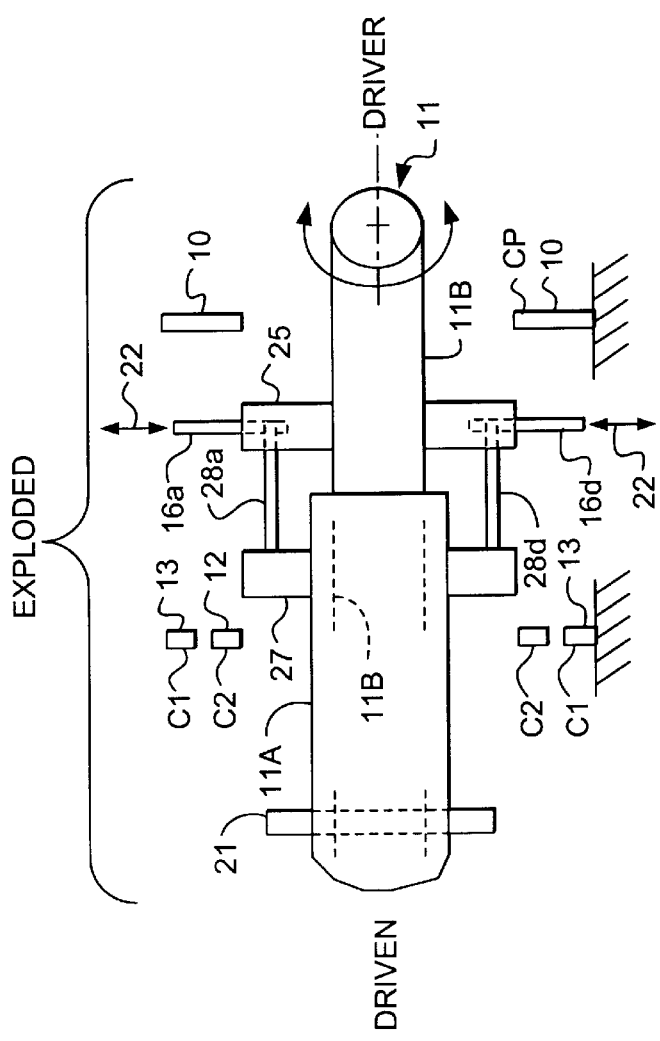
FIG. 5 is an exploded cross-sectional view illustrating how the components of the invention are mounted and interlinked.

FIG. 5 illustrates the actual shaft 11 which in one embodiment has a larger portion 11A which is concentric with and surrounds a smaller shaft portion 11B. Thus, at the right end of the shaft there might be a steering wheel for an automobile and at the left end a suitable power steering pump. Shaft portions 11A and 11B are coupled together by the pin 21. It is obvious the applied torque to the shaft portion 11B can be measured by the angular displacement or twist between the two shaft portions. Concentric capacitor rings 12 and 13 designated capacitors C1 and C2 encircle shaft portion 11B and then the single capacitor plate 10 or CP encircles portion 11B. Both of these capacitor plates do not rotate with the shaft 11 but are fixed as indicated. They are actually mounted in a housing as will be discussed below. The capacitor plates 12, 13 and then 10 are both juxtaposed on opposite sides of the six dielectric vanes 16a–16f. Once vanes 16a and 16d are shown. The vanes are mounted for rotation with the shaft 11. The dielectric vanes are also mounted for movement perpendicular to the axis of shaft 11 as indicated by the arrows 22. As will be discussed below, the amount of the radial movement of the vanes 16 is proportional to the angular displacement or twist of the shaft portion 11A and 11B.

Figure 6:
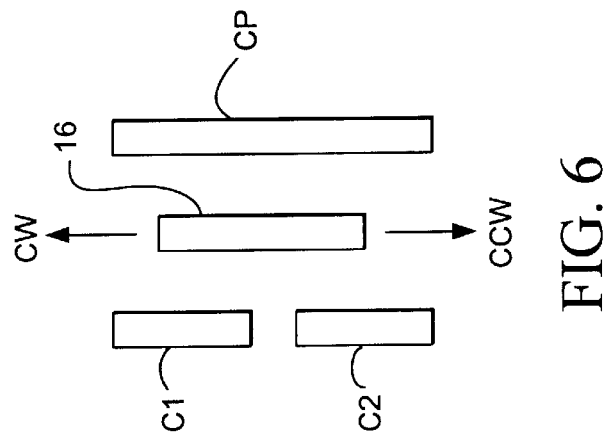
FIG. 6 is a simplified diagramatic view of a portion of FIG. 5 illustrating the operation of the present invention.

The foregoing is illustrated diagrammatically in FIG. 6 where the concentric capacitor rings C1 and C2 are juxtaposed on one side of the vanes 16 and the other capacitor ring CP is juxtaposed on the other side of the vanes 16. The zero torque conditions is illustrated in FIG. 6 where the vanes 16 equally cover C1 and C2. Zero torque is shown in the diagram of FIG. 4. And as illustrated in that diagram, movement of the vanes 16 in one direction indicates clockwise applied torque and the opposite direction counter-clockwise applied torque.

Now to return briefly to FIG. 5, in order to produce the desired perpendicular and proportional movement of the vanes 16, the vanes are mounted on an inner shaft rotor 26 on the shaft portion 11B. Then an outer shaft rotor 27 is fixed for rotation with shaft portion 11B and includes pins 28a–28f which are parallel to the shaft axis 11 and extend into inner shaft rotor 26 as illustrated. The twist or angular displacement of the shaft 11 is also, of course, related to the angular displacement between the inner and outer shaft rotors 26 and 27.

Figure 7:
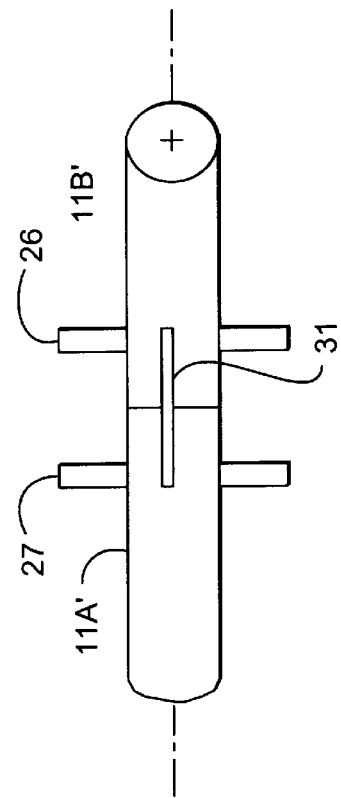
FIG. 7 is a plan view of an alternative embodiment of FIG. 5.

Briefly referring to FIG. 7 which is an alternative shaft construction to FIG. 5, rather than concentric shaft portions, shaft portions can be colinear as illustrated at 11A[1] and connected by a buried torsion bar 31. The shaft portions would still carry in the same manner the rotors 26 and 27 to indicate twist or torque.

Figure 8:
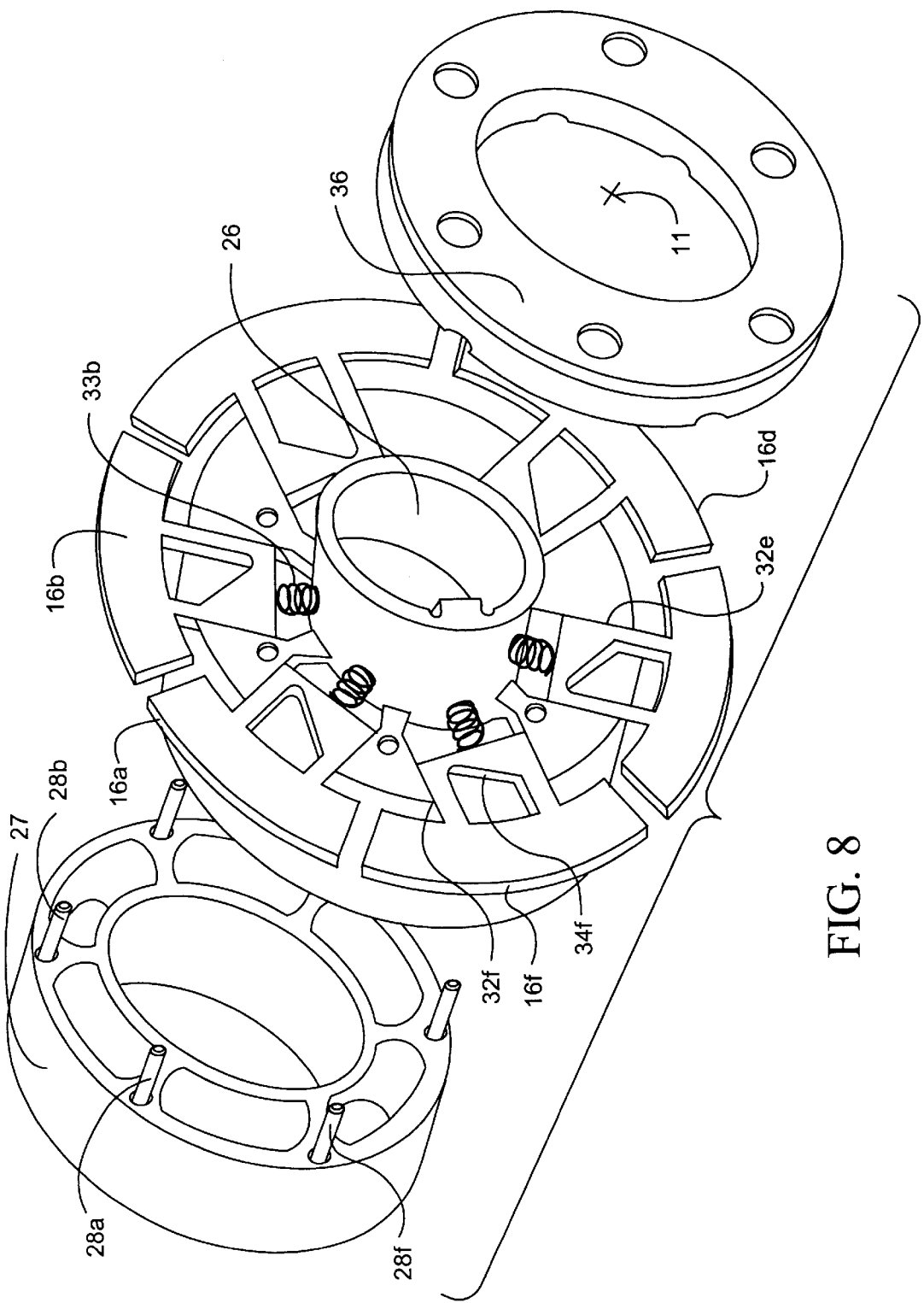
FIG. 8 is an exploded perspective view illustrating components of the invention.

The exploded perspective view of FIG. 8 illustrates in mechanical detail the outer shaft rotor 27 and inner shaft rotor 26 as they would be coupled together on the shaft 11 linked by the pins 28a–28f. The outward radial movement of the dielectric vanes 16a–16f which is caused by the angular offset of the outer and inner shaft portions is created in this shaft interface assembly. Six dielectric vanes fit into grooves 32a–32f in inner shaft rotor 26 which permit motion in the radial direction only. The dielectric vanes are spring loaded from behind by the springs 33a–33f which force them in an outward radial direction. Each vane 16 also includes a slanted cam surface 34a–34f on which the respective pins 28a–28f ride and stop the outward radial movement of the dielectric vanes. The slanted cam surface on the vanes on which the guide pins rest, force the dielectric vanes to move in the radial direction. Finally, the shaft interface assembly 26, 27 is fastened together by the rotor cover 36 by appropriate mounting screws.

Figure 9C:
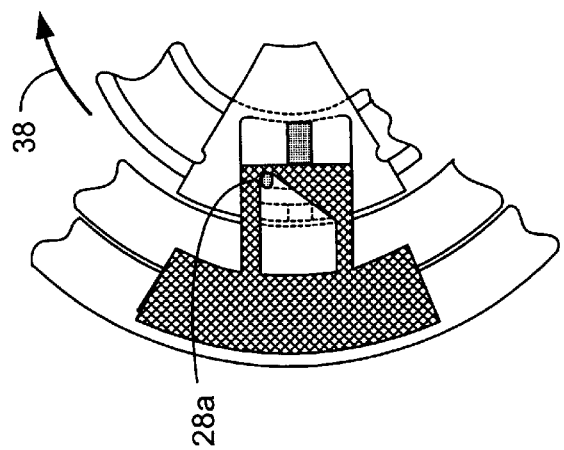
FIGS. 9A, 9B and 9C are fragmentary cut-away plan views of a portion of FIG. 8 illustrating different operational conditions.
Figure 9B:
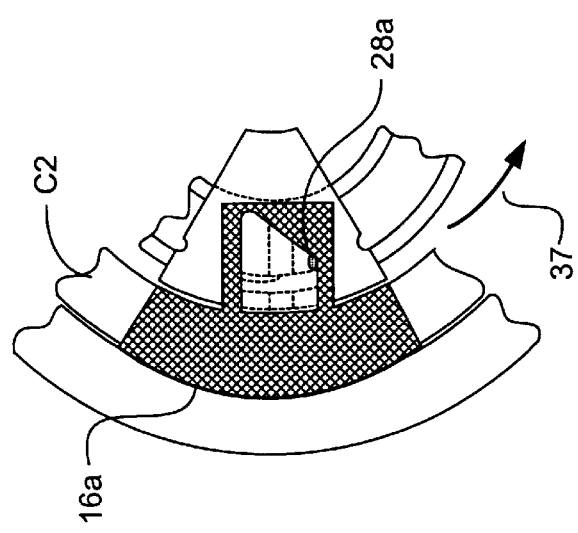
Figure 9A:
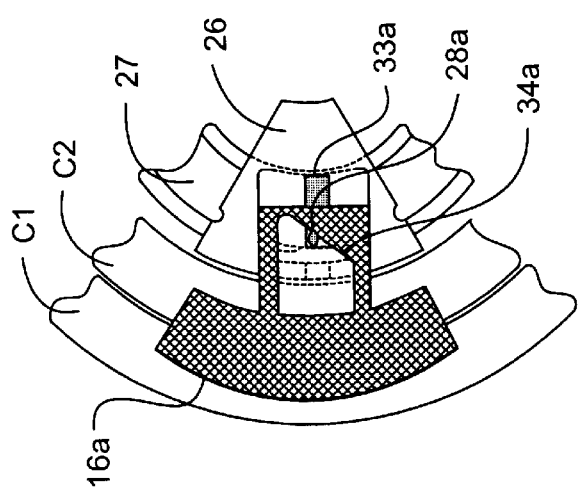

Movement of the dielectric vanes across the two capacitor plates C1 and C2 is controlled by the amount of twist of the inner shaft rotor 26 and the outer shaft rotor 27. FIGS. 9A, 9B and 9C show enlarged fragmentary views of three different positions of vane 16a as determined by the angular twist between rotors 26 and 27. Note that pin 28a rides on the cam surface 34a of vane 16a. Pin 28a, of course, extends from the outer shaft rotor 27. Spring 33a biases the cam surface 34a against the pin 28a. In the position shown in FIG. 9A the vane 16a lies equally over C1 and C2 so that with no relative angular offset a zero torque as indicated as discussed in conjunction with FIG. 4. The specific geometry between the two concentric rings and their equal areas provide such balanced condition. Movement in a counter-clockwise direction is illustrated by the arrow 37 in FIG. 9B and forces the dielectric vane 16a to a position indicated where only the capacitor ring C2 is covered. FIG. 9C indicates the angular offset in the clockwise direction 38. This is a maximum as indicated again on FIG. 4.

Figure 10:
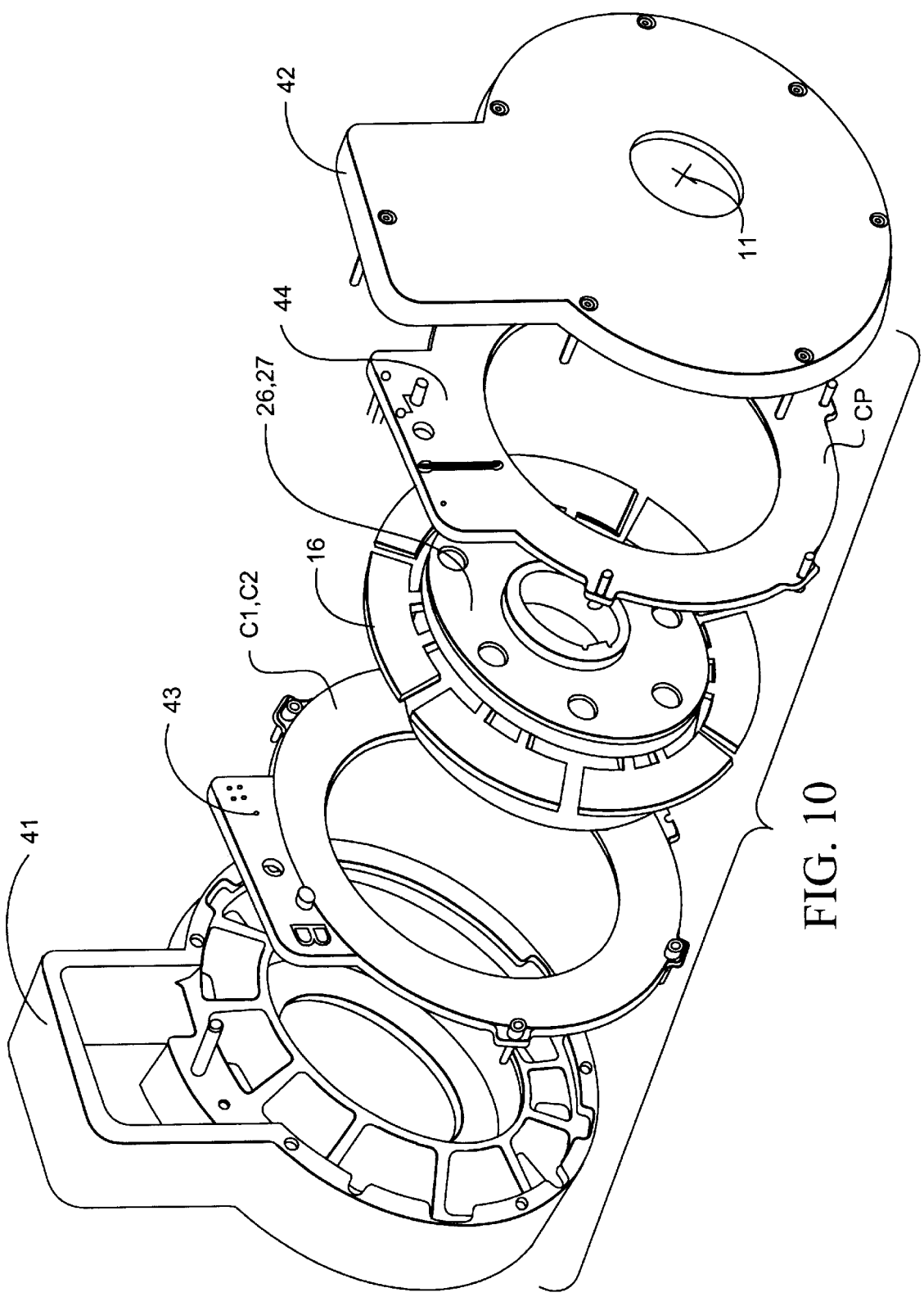
FIG. 10 is an exploded perspective view showing how the components of the invention would be installed together on a shaft.

FIG. 10 is an exploded view showing the individual parts and the mechanical assembly of the torque sensor. Shaft 11 would extend through all of the elements illustrated. At the left and right end there is a housing portion 41 and a cover 42 a both being fixed both in the axial and radial directions. A printed circuit board 43 is contained in housing portion 41 and carries the concentric capacitor rings C1 and C2. Similarly, the printed circuit board 44 which carries the capacitor plate CP is fastened to the cover 42. Then the shaft interface assembly as illustrated in FIG. 8 includes, of course, the inner and outer shaft rotors 26 and 27 and the vanes 16. This assembly freely rotates inside the housing and cover 41, 42.

Thus, in summary, the present design for a non-contacting torque sensor can detect small changes in capacity for small angles of differential displacement. Sensitivity is enhanced because of the design of the dielectric vanes with respect to the opposed capacitor rings and plate.

What is claimed is:

1. A vertical movement capacitive torque sensor for a rotating shaft having an axis of rotation and having two shaft portions for which applied torque to one shaft portion causes an angular displacement with respect to the other shaft portion said sensor comprising:

means for capacitively sensing said angular displacement between shaft portions including, at least one dielectric vane mounted for movement perpendicular to said axis and rotatable with one said shaft portion, said vane having a cam surface on which a pin mounted for rotation with said other shaft portion rides and opposes means biasing said vane in a radially outward direction, a pair of concentric capacitor plate rings lying in a common plane encircling one shaft portion and juxtaposed with said vane, one of said rings having a greater diameter than the other, an opposed capacitor plate encircling the other shaft portion and also juxtaposed with said vane, electrical bridge means for comparing the capacitances formed between said pair of concentric rings and said opposed capacitor plate as modified by said movable vane for determining said angular displacement and applied shaft torque.

2. A vertical movement capacitive torque sensor as in claim 1 where said shaft portions are concentric.

3. A vertical movement capacitive torque sensor as in claim 1 where said shaft portions are colinear and connected by a torsion bar.

4. A vertical movement capacitive torque sensor as in claim 1 where under zero torque conditions said at least one vane is equally juxtaposed over said pair of concentric rings whereby said compared capacitances are equal.

5. A vertical movement capacitive torque sensor as in claim 1 where said pair of capacitor plate rings and said capacitor plate are fixed to a common housing.

6. A vertical movement capacitive torque sensor as in claim 1 where said cam surface has maximum and minimum locations and said pin is in the middle of said cam surface locations under zero torque conditions.

7. A vertical movement capacitive torque sensor as in claim 1 where there are six said vanes mounted on said shaft portion.

8. A vertical movement capacitive torque sensor for a rotating shaft having an axis of rotation and having two shaft portions for which applied torque to one shaft portion causes an angular displacement with respect to the other shaft portion said sensor comprising:

means for capacitively sensing said angular displacement between shaft portions including, at least one dielectric vane mounted for movement perpendicular to said axis and rotatable with one said shaft portion, means coupled to said other shaft portion for moving said vane proportionately to said angular displacement, a pair of concentric capacitor plate rings lying in a common plane encircling one shaft portion and juxtaposed with said vane, one of said rings having greater diameter that the other, an opposed capacitor plate encircling the other shaft portion and also juxtaposed with said vane, electrical bridge means for comparing the capacitances formed between said pair of concentric rings and said opposed capacitor plate as modified by said movable dielectric vane for determining said angular displacement and applied shaft torque.

\* \* \* \* \*